Nov. 7, 1950                C. E. FRASER             2,529,286
APPARATUS FOR RELEASING OIL FROM AND FOR REMOVING
THE SURFACES FROM CITRUS FRUITS AND THE LIKE
Filed June 28, 1947                             6 Sheets-Sheet 1

INVENTOR.
Charles F. Fraser

BY Norman N. Holland
his ATTORNEY

Nov. 7, 1950     C. E. FRASER     2,529,286
APPARATUS FOR RELEASING OIL FROM AND FOR REMOVING
THE SURFACES FROM CITRUS FRUITS AND THE LIKE
Filed June 28, 1947     6 Sheets-Sheet 2

INVENTOR.
Charles E. Fraser

BY Norman H. Holland
his ATTORNEY

Nov. 7, 1950     C. E. FRASER     2,529,286
APPARATUS FOR RELEASING OIL FROM AND FOR REMOVING
THE SURFACES FROM CITRUS FRUITS AND THE LIKE
Filed June 28, 1947     6 Sheets-Sheet 4

INVENTOR.
Charles E. Fraser
BY
Norman R. Holland
his ATTORNEY

Patented Nov. 7, 1950

2,529,286

UNITED STATES PATENT OFFICE 2,529,286

APPARATUS FOR RELEASING OIL FROM AND FOR REMOVING THE SURFACES FROM CITRUS FRUITS AND THE LIKE

Charles E. Fraser, Clearwater, Fla., assignor to Fraser-Brace Engineering Co., Inc., New York, N. Y., a corporation of New Hampshire Application June 28, 1947, Serial No. 757,720

7 Claims. (Cl. 146—3)

The present invention relates to the grating of fruits, particularly citrus fruits, and to the removal and recovery of the oils, waxes and other substances from the outer surface thereof, although certain features may have a wider use.

Citrus fruits have a peel comprising an outer yellow part, commonly called the flavedo, and an inner white part, commonly called the albedo. Both parts have valuable constituents. The flavedo or outer yellow part contains oils, waxes and other substances which are quite valuable in the manufacture of perfumes and other products. Further, these oils, and other substances, if not substantially removed oxidize easily and impart bitterness and a generally disagreeable taste to orange juice, when the juice is extracted commercially. The oil is contained in small sacs within the peel of the fruit and is difficult to remove. In the present commercial practice of extracting orange juice there is a loss of fifteen to twenty-five percent of the juice in the orange and the flavor and keeping qualities are impaired by the excessive amount of peel oil and other peel ingredients therein.

Various attempts have been made, to provide methods and machines to recover commercially the valuable oil in the peel, to separate it from the juices and pulp, to increase the yield of juice and to improve its flavor, but have not met with success. Likewise attempts to provide methods and machines for removing the outer surface before juicing have been unsuccessful. The problem is complicated by the variations in the size of the fruit, in the thickness of the peel, and in the character of the peel. In addition, fruits are seldom spherical like a billiard ball but have flat spots and protruding portions. Hence machines tend to treat one part more than another, penetrating the juice cells, and are otherwise unsatisfactory.

The present invention aims to overcome the above and other difficulties by providing a method and machine which will puncture and tear apart the oil sacs to release the oil and at the same time remove in the form of fine particles a substantially uniform thickness of the peel, and particularly, the oil-containing flavedo, without removing an excessive amount of the albedo and without laying open the edible portion of the fruit beneath the albedo. The invention aims to obtain a higher yield of juice and a better flavor by removal of the peel and oil before juicing to permit a more complete extraction of the juice with a minimum oil content. The invention also aims to provide a method and machine which will operate rapidly and which is simple, accessible and inexpensive in construction.

An object of the invention is to provide an improved method and machine for recovering the entrapped oil and other flavedo elements in the surface of citrus fruits.

Another object of the invention is to increase the amount of orange juice recovered from oranges and to improve the flavor thereof.

Another object of the invention is to avoid the excessive waste of juices involved in juicing processes designed to avoid excessive oil in the juices.

Another object of the invention is to remove the outer surface of articles such as citrus fruits and during such removal to tear apart the oil sacs to permit recovery of the oil therein.

Another object of the invention is to provide an improved method and machine for simultaneously recoverying the oil in the surface of citrus fruits and removing a limited part of the outer surface thereof.

Another object of the invention is to provide a machine which will operate on a substantial range of sizes of fruit, minimizing the amount of or completely eliminating sizing.

Another object of the invention is to provide a machine which will be effective upon fruit which is out of round and which may have other irregularities therein, without exposing the edible portion beneath the skin.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein.

The present machine and method are primarily adapted for citrus fruits such as grapefruit, oranges, tangerines and lemons. The invention finds its most extensive use in the treatment of oranges and to a lesser extent grapefruit. Tangerines, which are very much "out of round" and which present a severe condition, have been satisfactorily treated in the machine. For convenience the embodiments have been described throughout with reference to oranges. It will be understood, however, that this is not intended to exclude other fruits or vegetables which may be treated in the machine and is not intended to limit the invention beyond its true and comprehensive scope in the art.

Figures 1, 5, 6, 7, 7A:
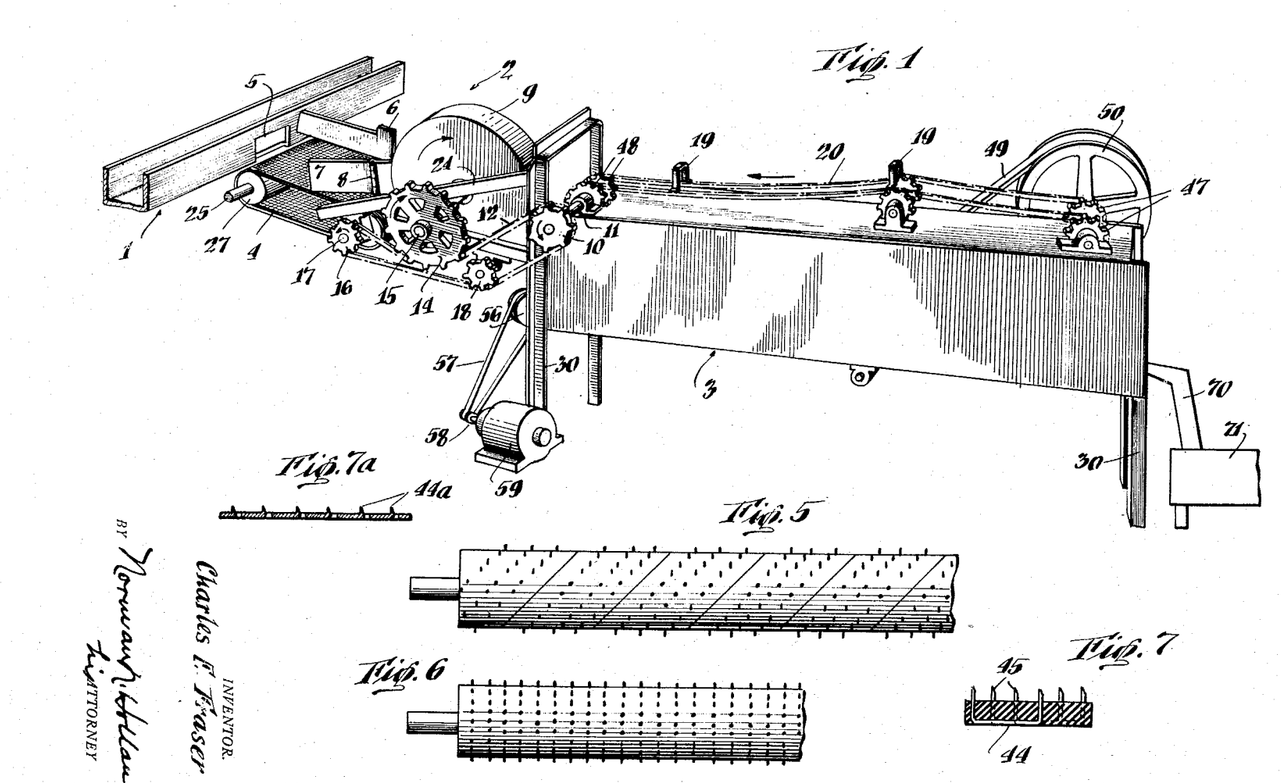
Fig. 1 is a perspective view illustrating one embodiment of the invention and one way of practicing the method.
Fig. 5 is a fragmentary side elevational view of a roller having spirally arranged abrading and puncturing projections on the surface thereof.
Fig. 6 is a fragmentary side elevational view of a roller having an abrading and puncturing surface on which the projections are not spirally arranged.
Fig. 7 is a fragmentary sectional view illustrating one form of puncturing and grating surface which may be applied to the rollers.
Fig. 7a is a fragmentary sectional view of another form of puncturing and grating surface.
Figure 2:
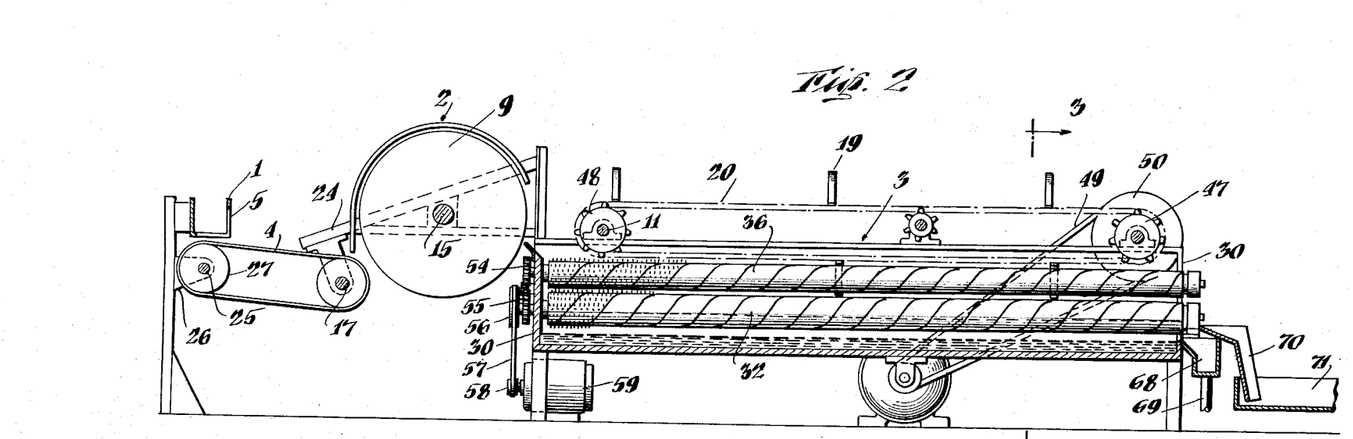
Fig. 2 is a longitudinal sectional view illustrating the interior of the machine shown in Fig. 1.
Figure 3:
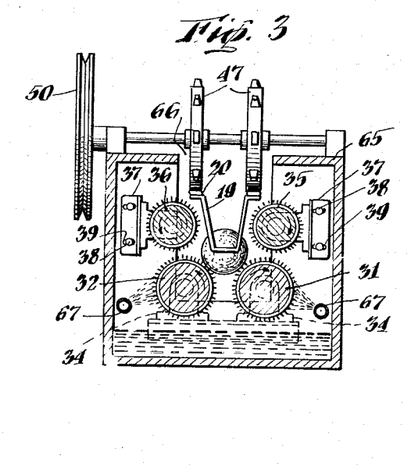
Fig. 3 is a sectional view along the line 3—3 of Fig. 2, illustrating the interior of the machine.
Figure 4:
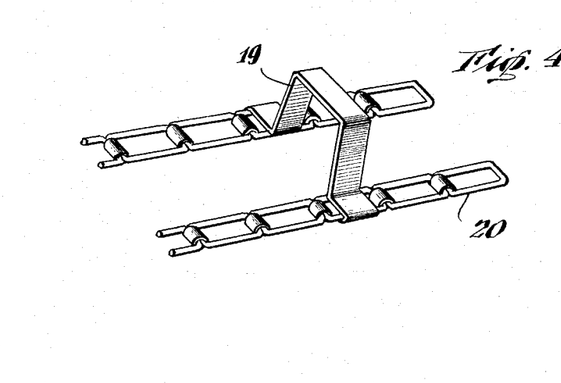
Fig. 4 is a fragmentary perspective view illustrating one embodiment of a chain and bracket for guiding the fruit through the machine.

Referring again to the drawings and more particularly to Figs. 1, 2 and 3 thereof, illustrating an embodiment of the invention and one way of performing the method, there is shown a chute or conveyor 1 leading from a suitable bin or other source of supply, not shown, along which citrus fruits, for example, oranges, pass and are delivered through an opening 5 therein. The fruit is received on an apron 4 and fed by a suitable feeding mechanism 2 to a machine 3 which tears apart the oil sacs and removes the outer surface thereof.

Figure 8:
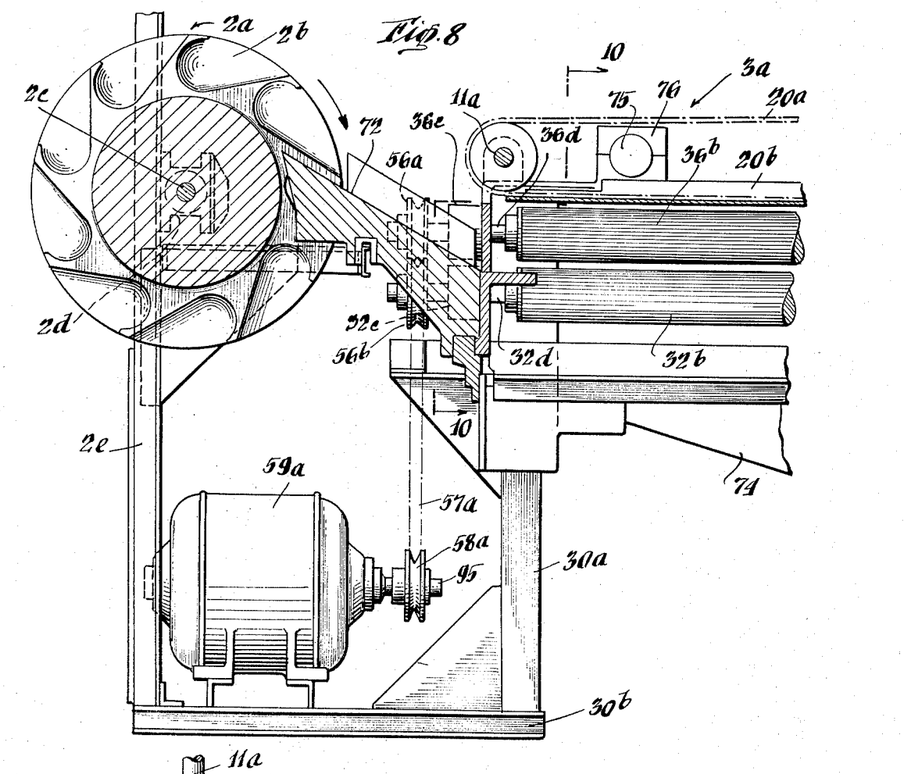
Fig. 8 is a fragmentary longitudinal sectional view of another embodiment of the machine.

The feeding mechanism 2 may be of any suitable type for receiving the oranges and delivering them one at a time to the machine 3. As illustrated in Figs. 1 and 2, a downwardly inclined apron 4 receives the fruit from the opening 5 in the chute 1. The oranges pass downwardly on the apron 4 between guides 6 and 7, the latter being adjustable about a hinge 8, and onto a rotary member 9 which has openings for receiving one orange at a time and delivering them to the machine 3. A more detailed showing of a suitable feeding mechanism is illustrated in Fig. 8.

The feeding mechanism is preferably driven from the machine 3 by sprockets 10 which carry a chain 12 that passes under sprocket 14 on shaft 15 for driving the feed or hopper 9 and about a sprocket 16 on shaft 17 for driving the roller at one end of the apron 4. The chain then passes under an idler 18 back to the sprocket 10. In this manner the feed is driven in timed relation with the machine 3. Movement of oranges through the machine 3 is adapted to be facilitated by members 19 and it has been found that the members 19 on the timing chain 20 sometimes damage an orange if it engages one "head on" as it is being delivered. To eliminate this the feed 9 may be of suitable size so that the same pocket in it is presented each time to the members 19. This pocket may be closed off so that no orange enters it and hence no orange will be fed at the time a bracket 19 is in position to interfere with the feed.

The apron 4 minimizes jamming or clogging of the fruit at the entrance to the rotary member 9. As will be noted in Figs. 1 and 2, the apron is inclined downwardly sufficiently so that the backward rotation does not prevent the free feed of the fruit. A suitable bracket 24 may be utilized for supporting the shaft 17 at one end of the apron and also for supporting the shaft 15 for the rotary member 9. The shaft 25 may be mounted on a bracket 26 to support the roller 27, carrying the other end of the apron 4.

Referring now to the machine 3, illustrated more particularly in Figs. 1, 2 and 3, there are end frames 30 supporting a plurality of rollers arranged in pairs in the preferred embodiment. As shown more particularly in Figs. 2 and 3 the lower pair of rollers 31 and 32 are adjustably mounted by brackets 34 and are spaced sufficiently close together so that an orange will not pass between them, as illustrated in Fig. 3. A second pair of rollers 35 and 36 are adjustably mounted above the first pair by brackets 37 held in position by bolts 38 in slots 39. The upper pair of rollers 35 and 36 are sufficiently far apart in the preferred embodiment that an orange may pass between these rollers. As indicated more particularly in Fig. 3, the rollers on the right are rotated in a clockwise direction and the rollers on the left in a counterclockwise direction. Rotation of the rollers in this manner, to urge the oranges away from the rollers when engaged thereby, is quite effective. With the four rollers tending to raise the oranges upwardly, oranges dance from one roller to another and each time they engage a roller there is a scraping and tearing action by means of the projections on the surfaces of the rollers. These projections tear the oil sacs and at the same time grate off a portion of the surface. The spinning of the oranges due to the action of the rollers causes repeated changes in the axis of spin and uniform removal of the surface as well as substantially complete disruption of the oil sacs throughout the surface. The fact that the orange is out of round does not affect the operation since the violence of the spin and the bouncing of the fruit due to changing directions causes the fruit to strike the abrasive surfaces hard enough to flatten out bumps or depressions in the contour of the fruit so that the abrasive reaches every part of even the most distorted fruits. As a result the oil sacs are torn apart and disrupted throughout and the outer surface is removed to a uniform extent, leaving part of the white albedo without exposing the edible part of the orange. Preserving the thickness of the albedo protects the fruit from being burst or punctured by the violence of the jumps.

As illustrated in Fig. 7, the surfaces of the rollers may be formed by wrapping on a suitable roller, made of any suitable material, a belt-like sheet having staples 44 therein with the relatively pointed ends of the staples protruding outwardly as shown at 45. The protruding length of the staples will depend to some extent on the fruit being treated. With oranges a projection of $3/100$ of an inch has been found to give good results. Another form of surfacing material is illustrated in Fig. 7a and may comprise a sheet of stainless steel or other acid resisting metal with slots punched therein to produce sharp projections 44a. Excellent results have been obtained with a sheet of metal having a thickness of $5/1000$ of an inch with slots punched therein, which are $1/8$ of an inch wide and $1/16$ of an inch long, producing pointed projections $3/100$ of an inch in height. It will be understood that variations may be made within limits in the height of the projections, in the size of the slots and in the number of projections. Preferably the sheet of surfacing material (either that of Fig. 7 or of Fig. 7a) is wrapped about a cylindrical roller as illustrated in Figs. 5 and 6 and secured in position thereon in any suitable manner. Preferably the sheet is made in strip form and wrapped about the roller spirally as shown in Fig. 5. This spiral arrangement of the projecting points is preferably in opposite directions for each pair of rollers as shown in Fig. 2 so as to change the direction of spin constantly and to urge the oranges forward through the machine. However, good results may be obtained by having the projections arranged circumferentially of the rollers as shown in Fig. 6. Other types of material for example a carborundum surface, may also be utilized.

It is desirable to regulate the period of time that the oranges are in the machine 3. Likewise it is desirable to prevent the oranges from being raised too high by the rollers which are effective thereon. If an orange fell with too great force onto the rollers, the edible portion might be exposed by a severe grating action. In the preferred embodiment a continuous chain 20 is shown passing over sprocket 47 at one end of the machine and sprocket 48 at the other end of the machine. Sprocket 47 may be connected to the main drive of the machine or it may have a separate drive by means of a belt 49 and pulley 50. Preferably a separate drive is utilized so that the speed of the oranges through the machine may be controlled without changing the rate of rotation of the rollers. The lower strand of the conveyor 20 should be sufficiently low to minimize excessive vertical movement of the oranges. The conveyor above the oranges is sufficient to time the oranges passing through the machine co-operating with the rollers but a more positive action may be obtained by securing to the chain brackets 19, the brackets being so spaced that a group of oranges may be fed between them. The exact number of oranges between any two brackets is not particularly important. A distance of 2 feet to 2½ feet between the brackets 19 has been found to give excellent results. Likewise a linear speed of about 20 feet per minute for the chain 20 has been found to give good results. The speed of the rollers may be varied within rather wide limits. Good results have been obtained with speeds as low as 400 R. P. M. and as high as 2300 R. P. M. A major consideration is to control the length of time that the oranges are subjected to the rollers so that the proper amount of orange surface may be removed. If this is achieved adequate disruption of the oil sacs will be attained also. The brackets 19 and the chain 20 may be utilized to control the time of passage along the rollers within close limits and to maintain the oranges in active relation to the operating rollers.

The rollers 31, 32 and 35 and 36 may be driven by gears 54 and 55 operated by a pulley 56, belt 57 and pulley 58 on the shaft of a motor 59 or any other suitable means such as the pulleys described hereinafter may be utilized for driving the rollers.

It will be noted (Fig. 3) that the abrading or grating rollers in the machine 3 are substantially enclosed by a casing 65 which has an opening 66 along its upper side to receive the chain 20. As shown in Fig. 3 also suitable sprays 67 are provided for spraying water at high pressure through copper pipes and fittings against the lower rollers as they rotate in grating the oranges. Similar sprays may be utilized for the upper rollers also but it is not essential as sufficient water will be thrown from the lower rollers to wet the upper rollers. The resulting slurry formed by the grated particles of the orange peeling, the oils and water settles to the bottom of the casing 65 and may be permitted to overflow into an outlet 68 (Fig. 2) and be drawn off through a pipe 69. The grated oranges may pass out through a chute 70 leading from the machine into a bin or suitable receptacle 71. By spraying the rollers with water and having the oils contact with the water on their liberation, volatilization and evaporation are reduced to a minimum.

Figure 9:
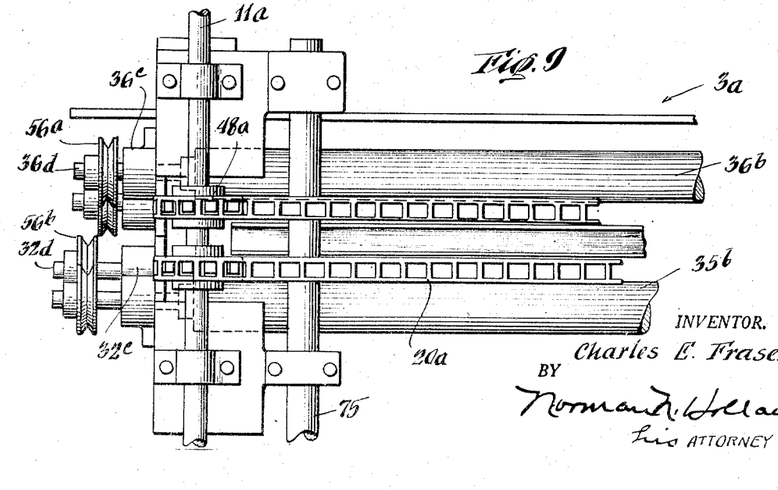
Fig. 9 is a fragmentary top plan view of the embodiment illustrated in Fig. 8.

Referring more particularly to Figs. 8 and 9, there is shown another embodiment of the invention. The apron 4 shown in Fig. 1 may be utilized, together with the guides 6 and 8, to deliver oranges or other citrus fruits to a feeding device 2a shown in Fig. 8. A series of pockets 2b therein is each adapted to receive a single orange, the shape of the pockets in section being somewhat like the letter J so that in passing the end of the apron 4 an orange will be picked up and when moved around to the opposite side will roll into a chute 72 leading to the machine 3a. The feed 2a may be mounted on a shaft 2c housed in bearings 2d supported by upright frame members 2e.

For convenience only the front end of this preferred embodiment is shown in Figs. 8 and 9 as the construction and operation thereof will be clear in view of the description of the embodiment of Figs. 1 to 7 and from the showing of one end of the machine in Figs. 8 and 9.

A suitable frame 30a extends upwardly from a base 30b and supports bearings 36c and 32c in which the ends 36d and 32d of rollers 36b and 32b are housed. The ends of the rollers 32d and 36d have mounted thereon pulleys 56a and 56b which are driven by a belt 57a passing about a pulley 58a on the shaft 95 of the motor 59a.

Figure 14:
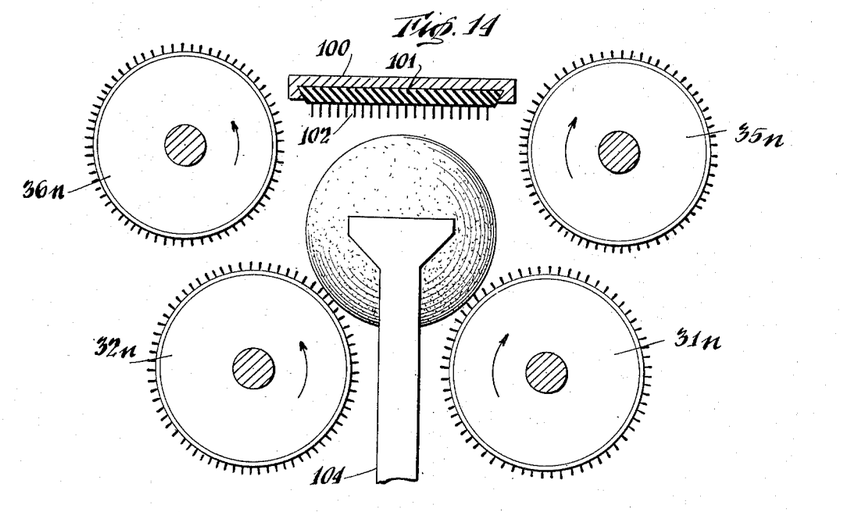
Fig. 14 is a diagrammatic illustration of another embodiment of the invention.
Figure 15:
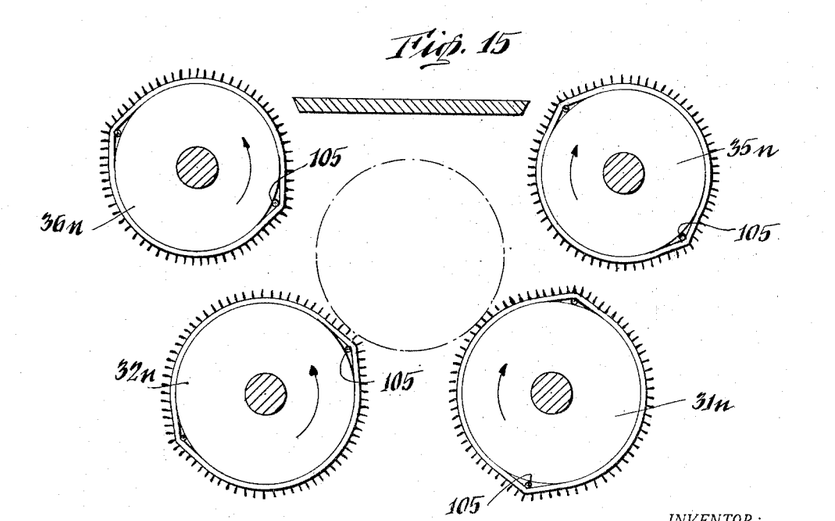
Fig. 15 is a diagrammatic illustration of a further embodiment of the invention.

It will be noted in Fig. 9 that the pulleys 56a are nearer the end of the machine than the pulleys 56b. The purpose of this is to permit the rollers of a series of units to be interconnected by a single belt, as shown more particularly in Fig. 13. The unit being described may be one of a series of units as illustrated more particularly in Figs. 9, 10 and 13. The rollers effective upon the fruit passing through the machine may be constructed in the same manner as illustrated in Figs. 5 through 7a and as described with reference to the first embodiment of the machine. The rollers may also be constructed as illustrated in Figs. 14 and 15 with longitudinal bulges at one or more points to increase the effectiveness of the abrading surface on the oranges. This feature will be more fully brought out hereinafter.

A shaft 11a at the opposite end of the machine may be operatively connected to a separate source of power, similarly to that shown in Fig. 2, whereby the time during which the rollers are effective on the oranges may be controlled independently of the speed of the rollers. Preferably each unit is enclosed by a suitable casing and suitable sprays similar to the sprays 67 (Fig. 3) may be utilized to spray the rollers. The resulting slurry formed by the water and the grated surface of the fruit may be collected in the lower part of the casing, as shown at 74, and removed in any suitable manner. The grated oranges may be delivered to a receptacle or conveyor at the outlet or discharge end of the machine.

Figure 10:
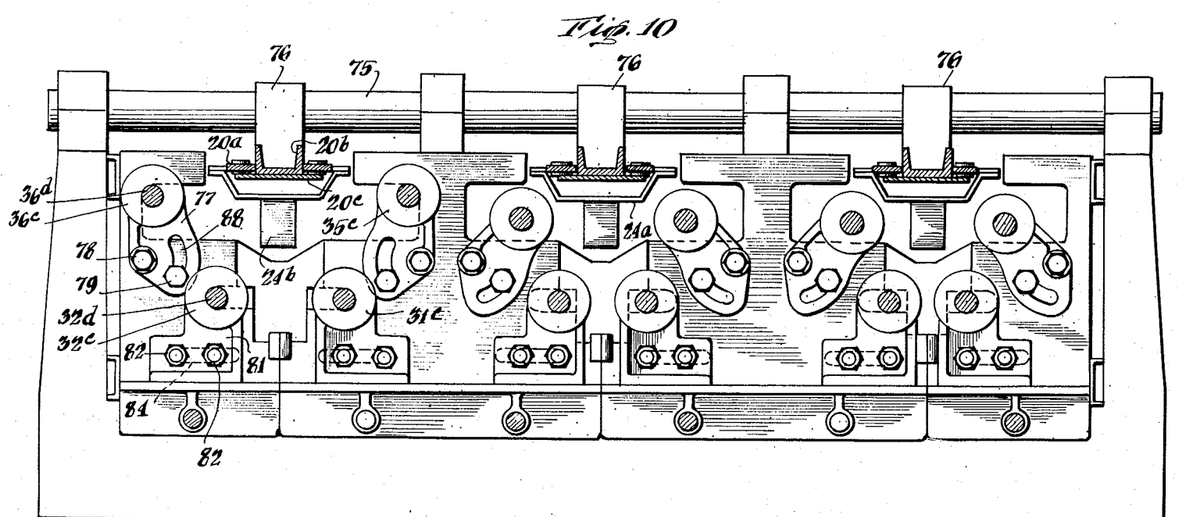
Fig. 10 is a sectional view along the line 10—10 of Fig. 8 illustrating a plurality of units in a single machine.
Figure 11:
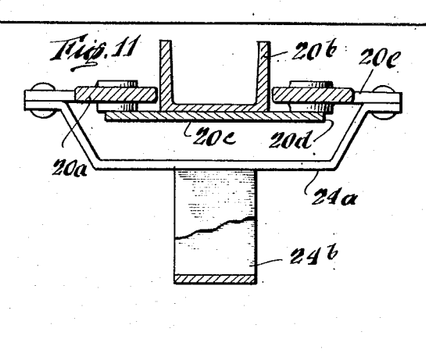
Fig. 11 is a transverse sectional view illustrating a preferred embodiment of the chain for guiding the fruit through the machine and the support for the chain.
Figure 12:
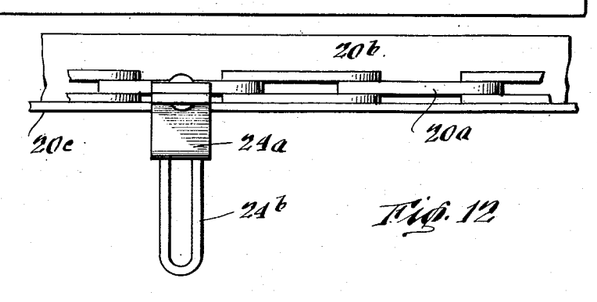
Fig. 12 is a fragmentary side view illustrating the chain and support shown in Fig. 11.

As shown more particularly in Figs. 11 and 12, a chain 20a, adapted to facilitate movement of oranges through the machine, is supported and guided by a channel member 20b having a plate 20c secured to its bottom surface and protruding outwardly as shown at 20d. Suitable brackets 24a are shown secured to extensions 20e on the chain with a protruding part 24b which extends down between the rollers to control the movement of the oranges or other fruit through the machine. The channel member 20b is shown in Fig. 10 suitably secured to a supporting rod 75 by means of members 76 secured thereto. The plate 20c also helps to contain the spray water and slurry in the casing.

As pointed out hereinbefore, the machine 3a illustrated in Figs. 8 and 9 may be and preferably is a part of a plurality of units each of which is alike and hence the description above of one will suffice for the description of all of them.

Referring more particularly to Fig. 10, which is a sectional view along the line 10—10 of Fig. 8, the roller shaft 36d is mounted in a bearing 36c on a suitable bracket 77 pivotally mounted by a bolt 78 and adapted to be held in adjusted position by a bolt 79 in a slot 80. This mounting permits the roller 36b to be swung about its pivot to accommodate large or small fruit. Likewise the roller 32b is mounted in a bearing 32c on a bracket 81 normally held in position by bolts 82 in a slot 84. The bearing 35c is mounted correspondingly to bearing 36c and the bearing 31c is mounted correspondingly to the bearing 32c to adjustably support the ends of the rollers carried thereby.

Thus, as shown in Fig. 10, there may be three units which may be suitably adjusted to take the same size fruit or three different sizes of fruit as desired. The unit at the left of Fig. 10 is shown adjusted to substantially fully open position, the unit in the middle adapted to receive an intermediate size fruit and the unit at the right adapted to receive a smaller size fruit. The roller shaft ends 36d and 32d are housed in suitable bearings as shown. This construction affords a compact unit and a simple way of securing maximum adjustment of the rollers.

Figure 13:
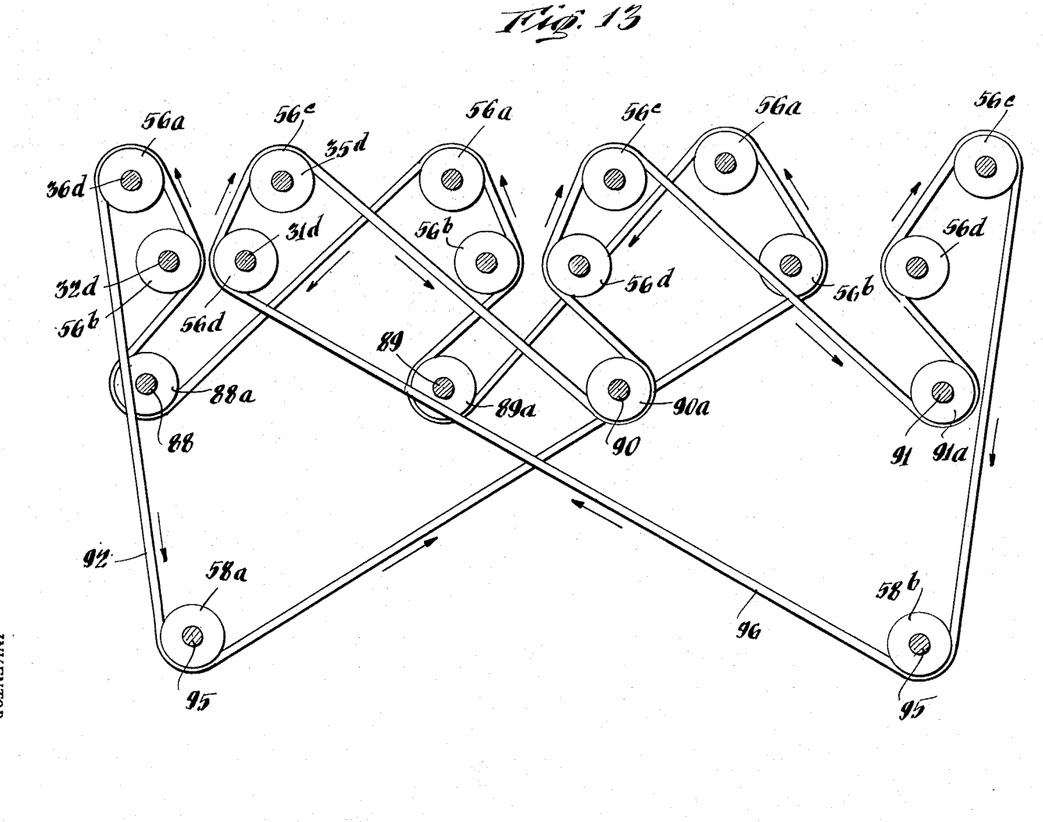
Fig. 13 is a diagrammatic view illustrating the drive for the plurality of units shown in Fig. 10.

Referring more particularly to Fig. 13 a preferred drive for a three unit machine is diagrammatically shown. The first unit designated by the shaft-like ends 31d and 32d of the lower pair of rollers and the ends 35d and 36d of the upper pair of rollers is shown at the left, a corresponding middle unit is shown and another side unit at the right. Four shafts, 88, 89, 90, 91, having idling pulleys 88a, 89a, 90a, and 91a, are provided for guiding and taking up slack in the belts.

In Fig. 13 it will be noted that pulleys are mounted on the respective roller ends and are driven by suitable belts. Pulley 56a is mounted on the roller end 36d, pulley 56b is mounted on the roller end 32d, pulley 56c is mounted on the roller shaft end 35d, pulley 56d is mounted on the roller shaft end 31d. In each of the units the pulleys for the roller shaft ends are numbered 56a, 56b, 56c, and 56d. The pulleys 56a and 56b are on one side of the unit and the pulleys 56c and 56d are on the other side of each unit. For convenience in driving, the pulleys 56a and 56b are set inwardly on the shafts further than the rollers 56c and 56d, in other words, the rollers 56a and 56b are offset slightly with respect to the rollers 56c and 56d. The rollers 56a and 56b are driven by a belt 92 which extends about a pulley 58a on a shaft 95 of the motor 59a shown in Fig. 8 but not shown in Fig. 13. The belt 92 extends about the pulleys 56a and 56b so that these pulleys are driven counterclockwise. These are the pulleys for the rollers on the left side of each unit. The belt 92 extends about the idling pulleys 88a and 89a which may be adjustable to take up slack.

The pulleys 56c and 56d on the ends of the pair of roller shafts mounted one above the other on the right side of each unit are driven by a belt 96 extending about a pulley 58b on a shaft 95 of a motor similar to 59a. The belt extends about each of the pulleys 56c and 56d and drives them in a clockwise direction as shown in Fig. 13. The belt likewise passes over idling pulleys 90a and 91a which may be adjustable to take up slack. By means of the two motors and the separate drives for the rollers on the respective sides of each unit the rollers on one side of a unit may be driven at a different speed than the rollers on the other to vary the treatment of the oranges although generally they are driven at substantially the same speed. The arrangement shown provides an effective and convenient means for driving the rollers of a series of units.

A modified form of the invention is illustrated in Fig. 14 wherein rollers 32n and 36n are shown on one side and rollers 31n and 35n are shown on the other side corresponding to the rollers described in the previous embodiment. A supporting strip 100 is mounted above the rollers with a belt 101 on the underside thereof having piercing projections 102 on the underside of it. This belt is driven slowly preferably in the direction of movement of the oranges. An additional means 104 either on the belt or extending upwardly from below the lower rollers may be utilized to guide and time the movement of oranges through the machine; however, the additional means is not essential.

The construction in Fig. 15 differs from that in Fig. 14 in that the means 104 and also the belt 102 have been omitted. In this construction the spiral arrangement of the projections on the rollers, as illustrated in Fig. 5, is very helpful in moving the oranges longitudinally through the machine. In addition the spiral arrangement gives a spin to the oranges causing them to have a universal movement. Each of the rollers 31n, 35n and 32n and 36n have protruding parts preferably at diametrically opposite sides although the number may be varied. This protrusion may be achieved by laying a wire 105 longitudinally of the peripheral surface, over which the abrasive is applied. This causes the covering with the projections on the surface to extend outwardly locally adjacent the longitudinally disposed wires, as shown in the drawings. It has been found to improve the results attained, The rollers of the preceding embodiments may be similarly constructed.

In the operation of the device oranges or other suitable fruit are delivered down the chute 1 (Fig. 1) and pass out through an opening 5 therein onto an apron 4 and between guides 6 and 7 where the feeding device 2, shown in more detail in Fig. 8, receives the oranges one at a time and delivers them to a chute 72 leading to the channel between the four rollers 32, 34, 35, and 36. These rollers are rotated so that the surfaces thereof engaging the oranges move upwardly tending to raise the oranges. The spiral arrangement of the projections tends to move the oranges through the machine and in addition tends to give a spin which is not directly upwardly but at an angle and in this way changes the axis of rotation of the oranges and gives them a universal spin so that various portions of the surfaces will be treated substantially uniformly. However, the peripheral arrangement of the projections as shown in Fig. 6 will give good results and a substantially uniform treatment. The projections on the surface of the rollers disrupt the oil sacs liberating the oil and simultaneously grating off the outer layer of the skin. Suitable sprays 67 (Fig. 3) wet the lower rollers and these in turn throw off water which wets the upper rollers so that the liberated oils contact the water immediately and forms with the removed surface a slurry in the bottom of the unit as shown in Figs. 2 and 3. The contact of the oil with the water minimizes volatilization and waste. The valuable oils may be recovered by suitable methods which are not a part of this application but form the subject matter of a separate invention.

The oranges with the outer surface of the skin removed pass out by the chute 70 (Fig. 2) into a receptacle 71. The slurry may overflow into the reservoir 68 and be withdrawn through the pipe 69. The treated oranges may be delivered to a suitable juice extracting machine where the orange juice may be almost entirely extracted commercially without being impaired in taste or quality by the inclusion therein of the oils in the skin. Tests have shown that about 96% of the juice in oranges may be extracted with fruit grated by the present machine as compared with 75 to 85% recovery by prior methods and that the resulting juice has a very low oil content of about 0.03% which improves the flavor and quality of the juice. The solid portions of the slurry are likewise useful as animal feed and for other purposes.

For convenience in manufacture and use a single machine includes three units as shown more particularly in Figs. 8 to 13. These units are preferably driven by a pair of motors as shown more particularly in Fig. 13. The chain with the brackets on it is adapted to time the movement of oranges in their passage through the machine. Preferably the chain brackets are far enough apart so that a group of oranges may be received between them. However, as indicated herein, good results may be obtained without the brackets 19.

It will be seen that the present invention provides an improved method and machine for puncturing and tearing apart the oil sacs in the skin of citrus fruits to recover the valuable oils therefrom and simultaneously to remove the outer surface without exposing the edible portion of the orange. The oil is prevented or minimized from vaporizing by contact with water giving a maximum recovery of the oil. The amount of the surface removed may be accurately controlled by increasing or decreasing the time during which the oranges are exposed to the grating rollers. By rotating the rollers so that oranges are always urged away from the rollers by the surfaces thereof, excessive removal of the surface in any one spot is eliminated or minimized. At the same time the oil sacs are torn apart concurrently with the grating action. The improved machine disrupted the oil sacs permitting recovery of the oil and simultaneously removes the outer surface layer in an effective and efficient manner. The juice may then be more completely extracted from the fruit with a minimum oil content giving a high quality juice. The recovery of juice is greatly increased and the quality and flavor improved. The machine is simple in construction, easy to operate and fully capable of standing the rough usage to which it may be subjected.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. In a device of the class described, the combination of a plurality of rollers forming a passageway for articles such as citrus fruits and having abrasive peripheral surfaces adapted to grate upon outer surfaces of said articles, certain of said rollers having their peripheral surfaces disposed wholly above the peripheral surfaces of others of said rollers and said certain rollers being horizontally spaced from each other a distance greater than the diameter of said articles but less than twice said diameter, and said other rollers being horizontally spaced from each other a distance less than the diameter of said articles, whereby articles are constrained to substantially single row relationship during movement along said passageway, and means for rotating said rollers to spin and bounce the articles around within said passageway between said abrasive peripheral surfaces during movement of the articles along said passageway.

2. In a device of the class described, the combination of a plurality of rollers forming a passageway for articles such as citrus fruits and having abrasive peripheral surfaces adapted to grate upon outer surfaces of said articles, certain of said rollers having their peripheral surfaces disposed wholly above the peripheral surfaces of others of said rollers and said certain rollers being horizontally spaced from each other a distance greater than the diameter of said articles but less than twice said diameter, and said other rollers being horizontally spaced from each other a distance less than the diameter of said articles, whereby articles are constrained to substantially single row relationship during movement along said passageway, means for rotating said rollers to spin and bounce the articles around within said passageway between said abrasive peripheral surfaces during movement of the articles along said passageway, and an endless conveyor having a length thereof intermediate said certain rollers limiting upward movement of said articles during spinning and bouncing thereof within said passageway.

3. In a device of the class described, the combination of a plurality of rollers forming a passageway for articles such as citrus fruits and having abrasive peripheral surfaces adapted to grate upon outer surfaces of said articles, certain of said rollers having their peripheral surfaces disposed wholly above the peripheral surfaces of others of said rollers and said certain rollers being horizontally spaced from each other a distance greater than the diameter of said articles but less than twice said diameter, and said other rollers being horizontally spaced from each other a distance less than the diameter of said articles, whereby articles are constrained to substantially single row relationship during movement along said passageway, means for rotating said rollers to spin and bounce the articles around within said passageway between said abrasive peripheral surfaces during movement of the articles along said passageway, means beneath said rollers adapted to receive material removed from the articles by said rollers, and walls extending upwardly from said means to a location above the rollers and thence inwardly over the rollers substantially enclosing the rollers.

4. In a device of the class described, the combination of a plurality of rollers having peripheral surfaces forming a channel for articles such as citrus fruits and having abrading means on said peripheral surfaces adapted to grate open outer surfaces of said articles, certain of said rollers having their peripheral surfaces disposed wholly above the peripheral surfaces of others of said rollers and said other rollers being spaced from each other a distance sufficient to prevent said articles from passing therebetween, the width of said channel formed by said peripheral surfaces being not greater than about twice the depth of said channel whereby articles may be constrained to generally linear relationship during movement along said channel, means adjacent said certain rollers preventing movement of articles out of said channel during movement therealong, and means for rotating said rollers to spin and bounce the articles around within said channel between said abrasive peripheral surfaces during movement of the articles along said channel.

5. In a device of the class described, the combination of a plurality of rollers forming a passageway for articles such as citrus fruits and having abrasive peripheral surfaces adapted to grate open outer surfaces of said articles, certain of said rollers having their peripheral surfaces disposed wholly above the peripheral surfaces of others of said rollers, means movably supporting at least one of said certain rollers adjacent opposite ends thereof for selectively varying the width of a space between said certain rollers, said other rollers being normally spaced from each other a distance sufficient to prevent said articles from passing therebetween, means for rotating said rollers to spin and bounce the articles around within said passageway between said abrasive peripheral surfaces during movement of the articles along said passageway, means adjacent said certain rollers limiting upward movement of articles during spinning and bouncing thereof within said passageway, means beneath said rollers adapted to receive material removed from the articles by said rollers, walls extending upwardly from said latter means to a location above the rollers and walls extending over the rollers for substantially enclosing the rollers.

6. In a device of the class described, the combination of a plurality of rollers forming a passageway for articles such as citrus fruits and having abrasive peripheral surfaces adapted to grate open outer surfaces of said articles, certain of said rollers having their peripheral surfaces disposed wholly above the peripheral surfaces of others of said rollers, means movably supporting at least one of said certain rollers and one of said other rollers adjacent opposite ends of each of them for selectively varying the width of a space between said certain rollers and a space between said other rollers, means for rotating said rollers to spin and bounce the articles around within said passageway between said abrasive peripheral surfaces during movement of the articles along said passageway, means extending generally longitudinally of said passageway for moving articles along the passageway, means adjacent said certain rollers limiting upward movement of articles during spinning and bouncing thereof within said passageway, means for directing a liquid onto some of said rollers for washing material therefrom, means beneath said rollers adapted to receive material removed from the articles by said rollers, walls extending upwardly from said latter means to a location above the rollers and walls extending over the rollers for substantially enclosing the rollers.

7. In a device of the class described, the combination of means comprising a plurality of rollers forming a passageway for articles such as citrus fruits and having abrasive peripheral surfaces adapted to grate open outer surfaces of said articles, certain of the rollers comprising said means having their peripheral surfaces disposed wholly above the peripheral surface of another of said rollers, and portions of said means being normally sufficiently close together to prevent said articles from passing therebetween, means movably supporting at least one of said certain rollers adjacent opposite ends thereof for selectively varying the width of a space between said certain rollers, means for rotating said rollers to spin and bounce the articles around within said passageway between said abrasive peripheral surfaces during movement of the articles along said passageway, means adjacent said certain rollers limiting upward movement of articles during spinning and bouncing thereof within said passageway, means beneath said rollers adapted to receive material removed from the articles by said rollers, walls extending upwardly from said latter means to a location above the rollers and walls extending over portions of the rollers for substantially enclosing the rollers.

CHARLES E. FRASER.

REFERENCES CITED

The following references are of record in the file of this patent:

UNITED STATES PATENTS

| Number | Name | Date |
|---|---|---|
| 744,774 | Lyon | Nov. 24, 1903 |
| 1,186,317 | Hood | June 6, 1916 |
| 1,228,103 | Franklin | May 29, 1917 |
| 1,699,995 | Shields | Jan. 22, 1929 |
| 1,995,693 | Urschel | Mar. 26, 1935 |
| 2,134,608 | Hawkins | Oct. 25, 1938 |
| 2,146,267 | Perez | Feb. 7, 1939 |
| 2,212,066 | Fry | Aug. 20, 1940 |
| 2,354,878 | Platt | Aug. 1, 1944 |
| 2,424,803 | Del Back | July 29, 1947 |